United States Patent
Porter (10) Patent No.: US 7,317,719 B2
(45) Date of Patent: Jan. 8, 2008

(54) COMMUNICATIONS NETWORK (75) Inventor: John David Porter, Cambridge (GB)

(73) Assignee: Cambridge Broadband Limited, Cambridge (GB)

(*) Notice: Subject to any disclaimer, the term of this patent is extended or adjusted under 35 U.S.C. 154(b) by 438 days.

(21) Appl. No.: 10/484,650

(22) PCT Filed: Aug. 9, 2002

(86) PCT No.: PCT/GB02/03651

§ 371 (c)(1),
(2), (4) Date: Jul. 9, 2004

(87) PCT Pub. No.: WO03/015346

PCT Pub. Date: Feb. 20, 2003

(65) Prior Publication Data

US 2004/0252680 A1    Dec. 16, 2004

(30) Foreign Application Priority Data

Aug. 9, 2001  (GB)  ................................ 0119456.2

(51) Int. Cl.
*H04L 12/50* (2006.01)
(52) U.S. Cl. ........................ 370/360; 370/352; 370/222
(58) Field of Classification Search ................ 370/222, 370/370, 360, 405, 452, 258, 401
See application file for complete search history.

(56) References Cited

U.S. PATENT DOCUMENTS 5,297,134 A * 3/1994 Takahashi et al. .......... 370/222
5,719,866 A   2/1998 Du et al.
5,809,076 A * 9/1998 Hofmann .................... 375/257

FOREIGN PATENT DOCUMENTS

| CA | 2327869 | 6/2001 |
|---|---|---|
| EP | 0 599 490 | 6/1994 |
| WO | WO97/50212 | 12/1997 |

* cited by examiner

*Primary Examiner*—Melur Ramakrishnaiah
(74) *Attorney, Agent, or Firm*—Fish & Richardson P.C.

(57) ABSTRACT

A packet switched communications network comprises a controller (11) and a plurality of controlled units (12, 13, 14) arranged in a ring. Each of the controlled units comprises a switch (31) at its input, each switch including control means (44) that are responsive to control instructions transmitted by the controller (11). Depending on the instructions the switch (33) will either be configured to pass control instructions and data into or out of the controlled unit (12, 13, 14), or to forward the control instructions and data to a further controlled unit (12, 13, 14) that is connected to the controller (11) or back to the controller (11). In order for units in the ring, that are not registered with the controller (11), to acquire an address, the controller (11) transmits periodically broadcast packets, which contain a unique registration address to be used by an unregistered unit. Once registered, the unit can receive control instructions from the controller (11) as well as data.

20 Claims, 5 Drawing Sheets

COMMUNICATIONS NETWORK

The invention relates to a packet switched communications network.

In fixed wireless access systems, which are used to deliver services to consumers by a radio link from an access point to subscriber units at consumer's premises, it is important to provide the most economical distribution of the required transmitters and receivers including their antennas and to manage the interface between the access points and the general communications network. In general the access point will comprise an interface unit which receives data over the public switched telephone network, or from other sources such as the internet, and converts the data into the correct format for transmission to the consumer over the wireless link. The access point also includes the necessary wireless transmission and reception apparatus and antennae. As a practical matter a single base station may comprise a plurality of access points which may be controlled by a smaller number of or even a single interface unit. The interface unit may be connected to the access points by copper conductors, coaxial cable or fibre optic cable depending on the distance between the interface unit and the access points and the bandwidth required.

The invention provides a packet switched communications network comprising a controller and a plurality of controlled units arranged in a ring, wherein each of the controlled units comprises a switch at its input, the switch including control means responsive to control instructions contained in packets transmitted by the controller, the control means being arranged to configure the switch so that in a first configuration the switch passes control instructions and data into or out of the unit and in a second configuration the switch bypasses the unit and passes the control instructions and data to a further unit connected to the controller or back to the controller.

The provision of a switch at the input of each unit which is responsive to control instructions received from the controller enables the connection of any number of units in a ring and instructions or data transmitted by the controller and meant for a particular unit will be passed through the switch in any intervening unit to the unit for which it is intended. In addition any data transmitted by a controlled unit to the controller will pass through the switch in any intervening unit back to the controller.

The controller may be arranged to transmit, periodically, broadcast packets which any unit not previously registered with the controller is able to detect, the broadcast packet including a unique registration address to be adopted by an unregistered unit for registration with and for subsequent control by and communication with the controller.

An unregistered unit, on detection of the broadcast packet, may adopt the unique address and modify the broadcast packet before passing it on to further units to prevent any subsequent unit from adopting the unique address. Broadcast packets are packets containing control data which have an address which is recognised by all unregistered or reset controlled units. This address is programmed into the controlled unit at manufacture.

In this way any unit newly inserted into the ring can be detected by the controller, as the newly inserted unit will have modified the broadcast packet before returning it to the controller, and the unit receives a unique address which can be used to direct control instructions and data to it. Since the first unregistered unit to receive the broadcast packet will adopt the address contained in the broadcast packet and will modify the broadcast packet before passing it on it can be ensured that only the first unit will adopt the unique address if more than one unregistered unit exists in the ring. Clearly once the broadcast packet has been modified no further unit will recognise it as a broadcast packet.

In one embodiment of the invention each controlled unit includes a watchdog timer which is set by receipt of the broadcast packet. The controller transmits at regular intervals a control instruction to cause the watchdog timer to reset. If the watchdog timer times out, the unit is arranged to reset so that it reacts to a subsequent broadcast packet to adopt a new registration address.

By this means if a unit fails this can be detected by the controller since when the watchdog timer is reset in response to the control instruction the unit will send a response to the controller and clearly if the controller does not receive the response it will be able to deduce that the watchdog in that particular unit has failed to respond. If it does not receive a response from any of the units then it will be able to deduce that the ring has broken either because of a cable failure between the units or because of a malfunction in one of the units which causes the switch to be unable to bypass the unit.

Each of the controlled units may comprise a number of registers to or from which the controller may write or read instructions or data. At least some of the registers which may be read by the controller may contain information entered during manufacture identifying the controlled unit and its properties.

By providing for the controller to write data (control instructions) to registers in the controlled units it is possible to enable the controller to configure and control the units using a processor in the controlled unit. The operation of the processor can be controlled by data written to the registers. In addition by enabling the controller to read data from registers in the controlled unit the controller can determine the properties of the unit, for example serial number, type number, software versions, etc., which are programmed into the controlled unit at the manufacturing stage as well as monitoring the state of operation of the controlled unit.

The above and other features and advantages of the invention will be apparent from the following description, by way of example, of embodiments of the invention with reference to the accompanying drawings, in which:—

Figure 1:
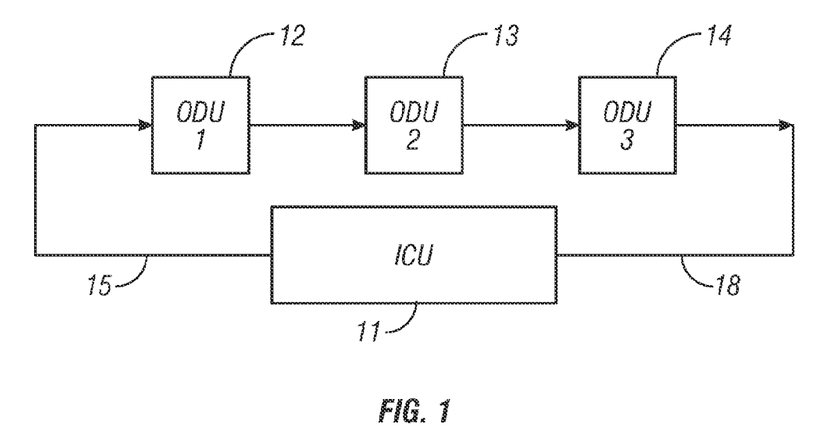
FIG. 1 shows in block schematic form a first embodiment of a communications network according to the invention.

FIG. 1 shows in block schematic form a first embodiment of a communications network according to the invention which comprises a controller 11 and three controlled units 12, 13 and 14. Cables 15, 16, 17 and 18 connect the controller 11 and controlled units 12, 13 and 14 in a ring. Each of the controlled units 12, 13 and 14 contains a switching arrangement 31 (FIG. 3) which is arranged either to pass control data packets which contain control instructions sent by the controller 11 into the controlled unit 12, 13 or 14 or to bypass the controlled unit and pass the information packet on to the next unit. Control of the switching arrangement 31 is performed by a processor 44 which recognises addresses within the control data packets sent by the controller 11 and configures the switching arrangement 31 appropriately according to whether the control data packet from the controller 11 is intended for that unit or for another unit in the ring. Thus if the control data packet is intended for that unit then the switching arrangement is configured to pass the control data packet into the controlled unit for use in controlling or monitoring the unit otherwise the switch is configured to pass the control data packet straight on to the next unit in the ring.

FIGS. 5 to 8 show the contents of control data packets which are transmitted by the controller 11 to the controlled units 12, 13 and 14 and which are used to configure the switching arrangement and to control functions of the controlled units 12, 13 and 14 or to monitor their state.

A change channel protocol is used to allocate and deallocate a unique control channel (ATM virtual circuit) that must be established between each controlled unit and the controller. The change channel protocol ensures that when a controlled unit is inserted into a ring disruption to other controlled units only occurs while the ring is incomplete. The control channel allocated by the change channel protocol is used by the controller to communicate directly with individual controlled units in order to access internal control and status registers. Once a control channel has been established between the controller and a controlled unit the change channel protocol uses the control channel to periodically check that the controlled unit is operating correctly. If for some reason the protocol detects that a previously configured controlled unit is inoperable it reclaims the control channel (ATM virtual circuit) allocated to it.

FIGS. 5 to 8 show control data packets containing the information elements generated by the change channel protocol to allocate or de-allocate control channels and to monitor the status of a configured controlled unit.

Figure 5:
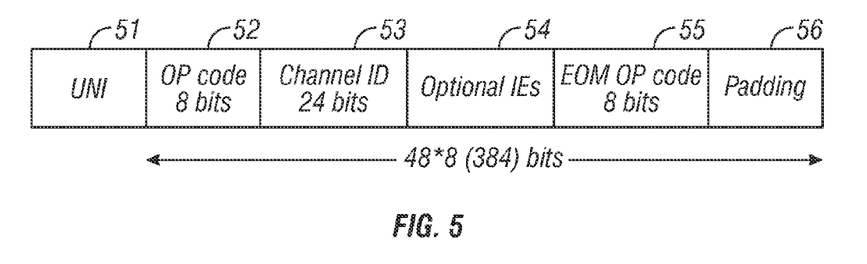

The control channel change information element shown in FIG. 5 of the change control protocol is generated periodically by a controller on a unique channel (ATM virtual circuit) in order to set up separate control channels between itself and unconfigured (or unregistered) controlled units. These controlled units may be newly resident in the ring and are considered unknown when first inserted into the ring or may be existing controlled units that have been reset. A control channel change information element is encapsulated within a single ATM cell to form a control channel change message as shown in FIG. 5. As shown in FIG. 5 the control channel change information element is contained within a control data packet which consists of an ATM cell header structure UNI 51 which includes a 24 bit address which will be recognised by all unregistered units which are connected in the loop. This is referred to herein as a broadcast packet. This header is followed by an 8 bit code OP code 52 which indicates that the packet is a control channel change request. This is followed by a 24 bit channel ID 53. This channel ID is the next available control channel (ATM virtual circuit) that may be used by an unregistered controlled unit to communicate with the controller. The remaining 352 bits of the packet are used to pass optional information elements 54. The change channel message is then terminated with an 8 bit end of message EOM OP code 55. Any remaining fields 56 of the message are padded with zeros. The optional information elements in the control channel change message are used to allow functions to be enabled or disabled as soon as a controlled unit receives a valid control channel. In a currently preferred embodiment an additional information element is included in the controlled channel change message to ensure that as soon as a controlled unit receives a valid controlled channel the controlled unit watchdog is activated. This ensures that if the controller fails to contact the controlled unit within a pre-determined time period, perhaps because it fails to receive a reply to the control channel change information element from the controlled unit, the watchdog resets the controlled unit allowing it to listen for the control channel change information element to be sent by the controller in the next broadcast packet.

Figure 6:
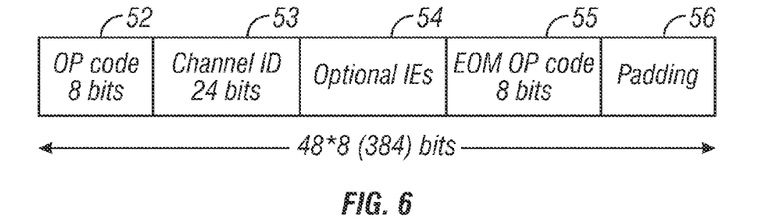

FIG. 6 shows a packet comprising the control channel change reply information element of the change channel protocol which is generated by an unregistered controlled unit in response to a control channel change information element contained within a control channel change message. The control channel change reply identification elements are generated by a controlled unit which has received the control channel change information element as shown in FIG. 5. Once a controlled unit has received and decoded this packet it changes the 8 bit OP code 52 to identify it as a control channel change reply message and then re-transmits the packet to the next unit in the ring. When a further controlled unit receives this message it relays the packet whether it has been assigned a control channel or not, since if it is an unregistered unit it will not recognise the packet as a control channel change message as the OP code has been modified and if it is a registered unit it will additionally not recognise the address in the packet as its own. If an unregistered or reset controlled unit is waiting for a control channel change message and receives a control channel change reply message it must relay the message first and then wait for the next control channel change message. When it finally receives a controlled channel change message it must then generate its own control channel change reply message. If interconnected in a ring the reply must then by relayed by all subsequent controlled units until it is passed back to the controller.

When the controller receives a control channel change reply message it completes the initialisation process by opening a connection to the controlled unit that generated the control channel change reply message using the channel contained in the message. Once this stage is complete both the controller and the controlled unit continually check that the other exists and take appropriate action if either fails. In this embodiment the control channel change message includes additional information elements which automatically sets a controlled unit onboard watchdog when a control channel is assigned. If a controlled unit is allocated a channel but the controller fails to periodically reset its watchdog this indicates a malfunction in the communication between the controller and the controlled unit and the controlled unit will reset and wait for a new control channel change message. It should be noted that when a controlled unit receives an instruction from the controller it returns a message to the controller to the effect that it has reset its watchdog. From the controller's perspective the act of resetting a controlled unit watchdog indicates that the controlled unit is active and behaving correctly. If, while attempting to reset a controlled unit watchdog, a failure occurs the controller may conclude that the controlled unit is no longer available and so deallocate the channel assigned to it. In the current embodiment the resetting of the controlled unit watchdog is achieved simply by writing a particular value to the controlled unit watchdog reset register using a multiple write information element, see later. A watchdog reset failure is assumed to occur when a reply to the multiple write information element fails to reach the controller.

Figure 7:
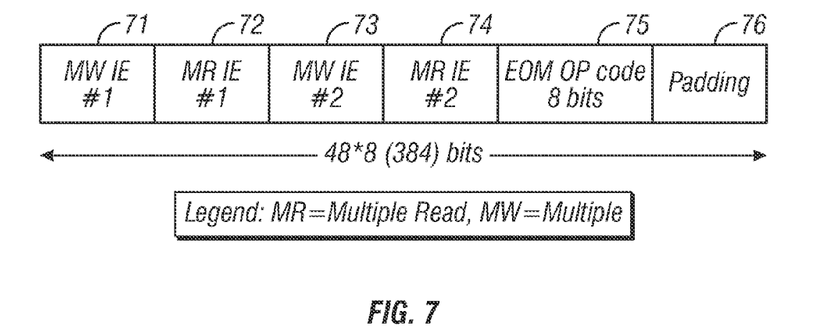

Once a unique control channel has been established between a controlled unit and a controller the channel can be used to remotely control the registers that exist on the controlled unit. Like the control channel change and reply messages the register access protocol is made up of register access information elements. Register access information elements may be encapsulated individually within an ATM cell or can be concatenated together in order to improve efficiency of transmission, to minimise latency, and to speed up response times. FIG. 7 shows how the different register access information elements may be concatenated together to occupy a single ATM cell. In this embodiment a first multiple write information element 71 is followed by a first multiple read information element 72. Then second multiple write 73 and multiple read 74 information elements are transmitted followed by an end of message OP code 75 and padding 76. It is of course not essential that the register access information elements are concatenated in this manner. A single register access information element may be contained in a single ATM cell with appropriate padding or more than two multiple write and/or multiple read information elements in any order may be concatenated until the ATM cell is fully occupied.

Figure 8:
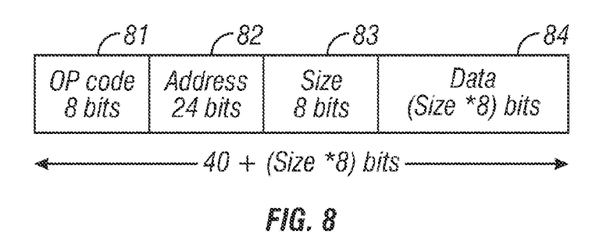

A multiple read information element contains three fixed length fields and one variable length field as shown in FIG. 8. The 8 bit OP code field 81 indicates the type of information element including a request reply bit. The 24 bit address field 82 specifies the register address of interest. The 8 bit size field 83 indicates the number of 8 bit data fields that should be read from the specified register and the variable length data field 84 reserves space in the information element for the data.

The 8 bit size field dictates the maximum number of 8 bit data words that can be stored in a multiple read information element is 256, however, the actual number of data words that can be encapsulated in a single multiple read information element is constrained by the size of the AAL0 PDU used to transport it over a ATM network thus the maximum data size of a multiple read information element is (384−40)÷8 that is 42.

When a controlled unit receives a multiple read request information element with bit 7 of the OP code set to zero it simply copies size register values from the address specified in the address field into the data field of the information element. It then sets bit 7 of the OP code field and returns the information element along with others in the access message to the controller.

Like the multiple read information element the multiple write information element contains three fixed fields and one variable field as shown in FIG. 8. The 8 bit OP code 81 indicates the type of the information element and the 24 bit address field 82 specifies the base register into which the data stored in the data field should be written. The 8 bit size field 83 determines the amount of data to be copied. When a controlled unit receives a multiple write request information element with bit 7 of the OP code set to zero it simply copies size values from the data field of the information element to the controlled unit registers starting at the address specified in the address field. It then sets bit 7 of the OP code field and processes the remaining information elements in the access message. Eventually when an end of message is encountered the controlled unit returns the entire access message to the controller.

As has been stated the reply generated by the controlled units to control change messages provides useful information regarding the state of the entire system. Such information is particularly useful if, for example, the controller loses contact with any particular controlled unit, that is it can more readily determine the nature of the failure. If a controller knows that the ring is broken, that is control channel activate messages are not being returned it can reduce the amount of work it must undertake in tearing down and reallocating channels once the ring is operational again. A controller can do this by ignoring subsequent channel access time-outs until the ring is functioning correctly, that is the controller starts receiving unmodified controlled channel change messages once again. It should then be able to communicate successfully with controlled units using the channels set up before the ring failed.

After power up or reset, controlled units monitor the control channel change address for control channel change messages. When an unregistered or reset controlled unit receives a message of this type it stops the message from being forwarded around the ring, or returned back to the controller unmodified, by changing the OP code of the control channel activate information element to an acknowledgement. It then re-transmits the message back to the controller by placing it back on to the ring. If a controlled unit regardless of whether it has been assigned a control channel or not receives a change channel reply message it should relay the message to the next device in the ring. This process will continue until the message is relayed back to the controller.

It will be apparent that in the arrangement shown in FIG. 1 that if any of the cables 15, 16, 17 and 18 are broken then the ring will not function. If the controlled units 12, 13 and 14 and the controller 11 are separated by large distances then the possibility of cable breakage is correspondingly increased and any cable breakage will result in a complete failure of the system.

Figure 2:
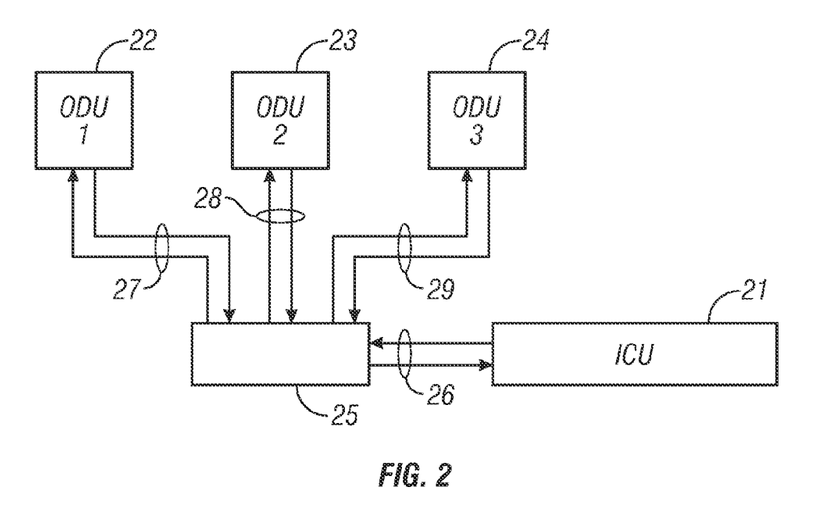
FIG. 2 shows in block schematic form a second embodiment of a communications network according to the invention.

FIG. 2 shows an alternative system in which the possibility of such failure is reduced. As shown in FIG. 2 a controller 21 is connected to a concentrator 25 via a cable 26. The concentrator 25 has a plurality of outputs which are connected via cables 27, 28 and 29 to controlled units 22, 23 and 24 respectively.

Figure 4:
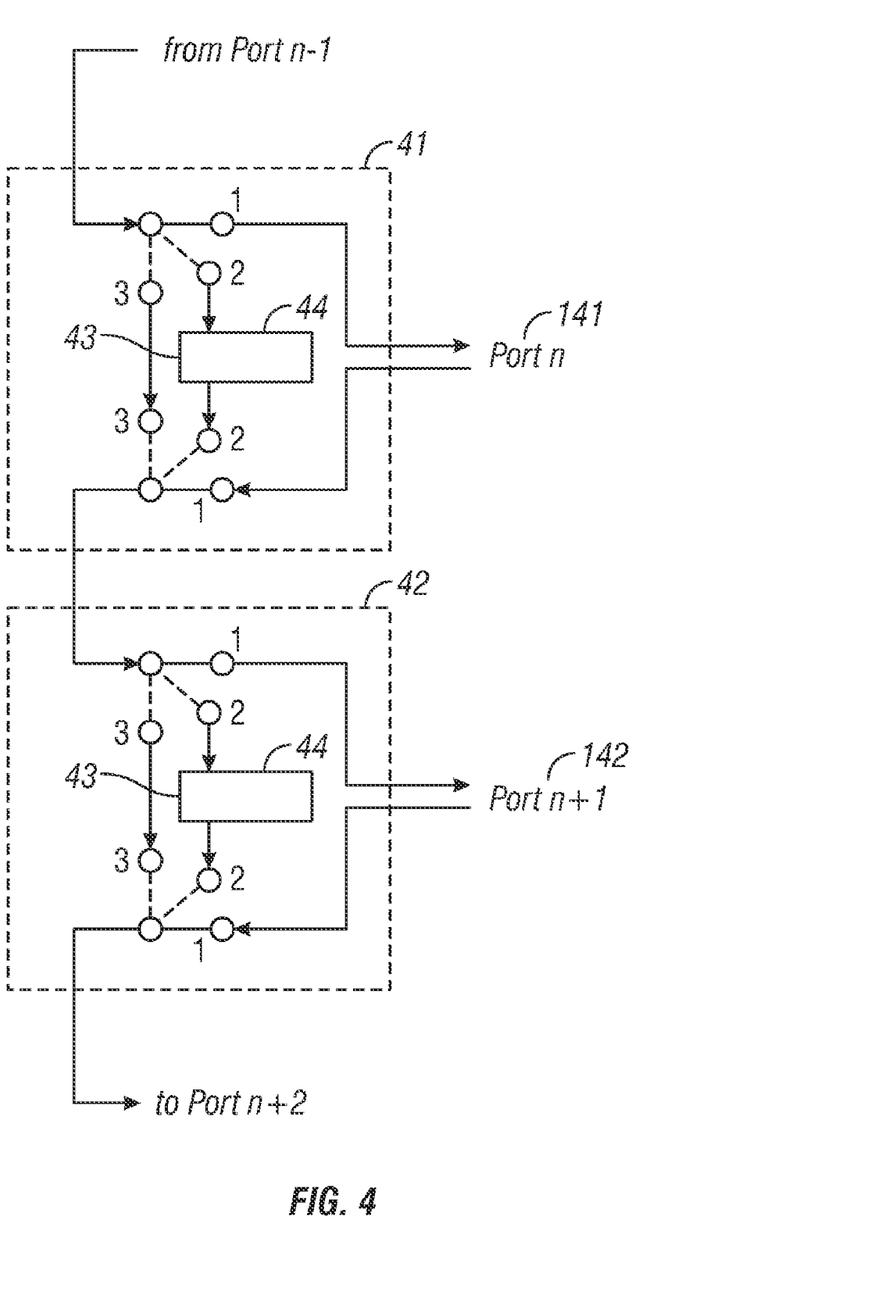
FIG. 4 shows in schematic form part of a concentrator for use in the network of FIG. 2, FIGS. 5 to 8 show control ans monitoring packets used for the control and monitoring of the controlled units in the embodiments of FIGS. 1 and 2.

FIG. 4 shows part of the concentrator 25 which comprises a plurality of switching arrangements 41, 42 etc., only two of which are shown in FIG. 4, which are connected in a ring. Each switching arrangement 41, 42 etc has an output which is fed to a corresponding port 141, 142 etc. The switching arrangements comprise a switch through path 43 and a port output path. The switching arrangement is controlled by a processor 44 which may be provided for each switching arrangement or may be shared by a plurality of switching arrangements. The processor 44 is a management processor and is used for configuring the VCI range for the port. It will be clear, in this arrangement, that the bypass path 43 is activated unless the packet is addressed to the controlled unit connected to the port. Thus if one of the units 22, 23, 24 becomes disconnected from the concentrator 25 the bypass path 43 will be activated whenever the packet is destined for one of the other units and the failure will be restricted to the controlled unit connected to one port only. The processor 44 will cause information elements to be passed through the port when the packet address indicates that the information elements are to be passed to the controlled unit attached to that port.

It will be apparent that the concentrator comprises a ring and that control data has to be injected into the ring via one of the ports by the controller and is then passed out through the particular port that is connected to the controlled unit for which the control data is destined. Any response from the controlled unit is fed back into the particular port and transported around the ring until it reaches the switching arrangement controlling the port to which the controller is connected where it is switched to the port output and passed to the controller.

The controlled units 22, 23 and 24 will include a switching arrangement 31 even though a similar arrangement is provided in the concentrator 25 since the control registers are located within the controlled unit rather than in the concentrator. The concentrator itself will have certain registers which may be accessed via the controller 21 for example to identify itself as a concentrator and to indicate whether or not a unit is attached to its port. Clearly in this case the controller is able to identify a particular unit which has failed since the other units will receive and return information elements via the concentrator without needing to pass through the failed unit. The controller will detect which units are not returning acknowledgments and hence be able to deduce which unit has failed whether by reason of a failure in the cable between the concentrator and the unit or a failure in the unit itself.

Figure 3:
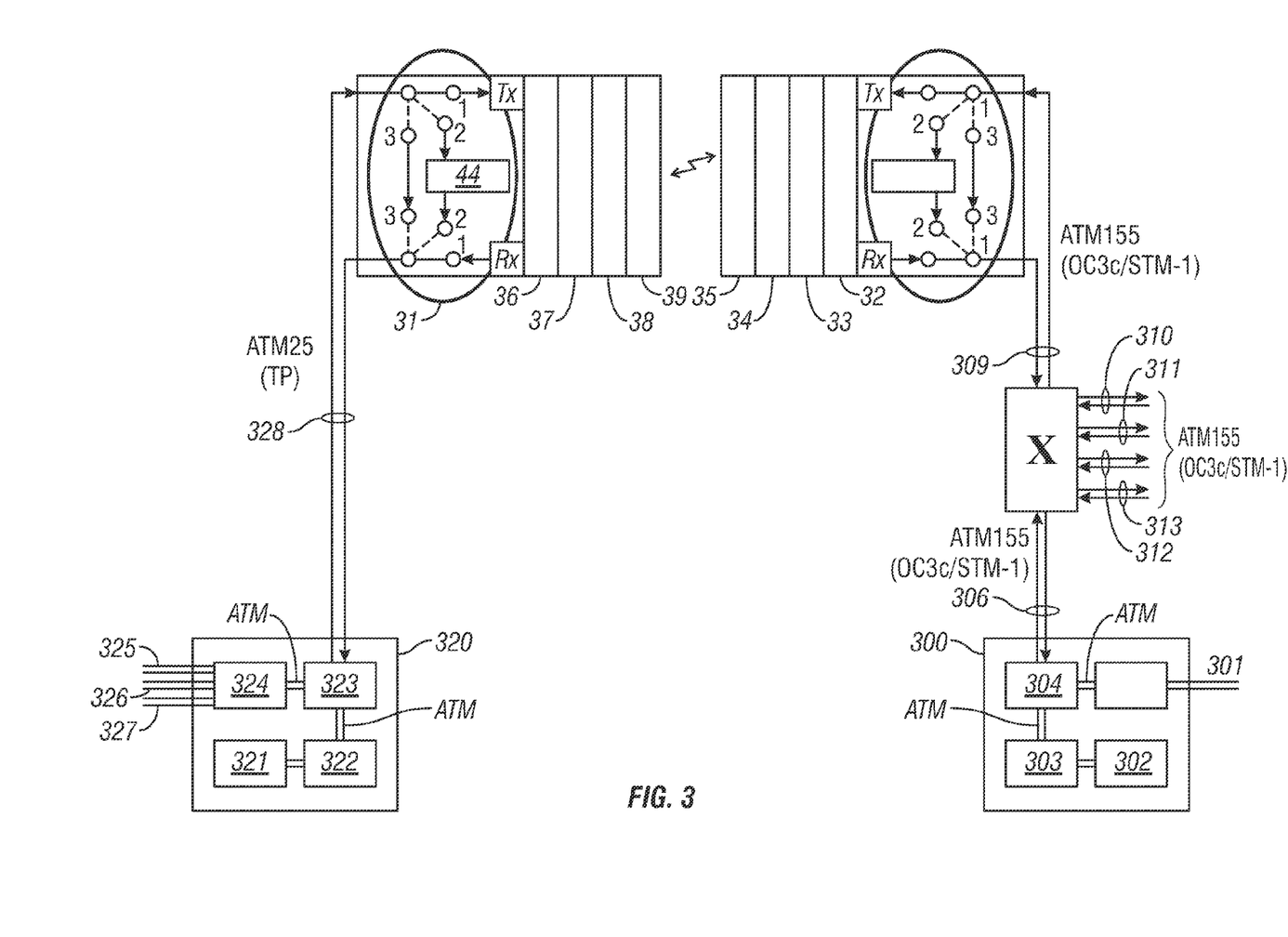
FIG. 3 shows in greater detail a controller and controlled unit.

FIG. 3 shows how a system according to FIG. 2 may be implemented as part of a fixed wireless access communication system. The system shown in FIG. 3 shows only a single access point and a single subscriber unit. In practice such a system will consist of a plurality of access points each of which transmit data to and receive data from a plurality of subscriber units over a radio link. The access point comprises an interface unit which receives from and transmits to a greater communication system via a link 301 over which is received and transmitted data packets using various protocols such as ATM and IP. The interface unit comprises a digital signal processor 302, a microprocessor 303, an ATM physical layer 304 and a physical layer 305 which converts the signal to and from the format that is required for communication with the general network. ATM cells are transmitted from the physical layer 304 via a cable 306 to a concentrator 307. ATM cells are also received by physical layer 304 from the concentrator 307 via the cable 306 which may be an optical fibre and the transmission protocol may be ATM 155 (OC3c/STM-1). The concentrator 307 is as described with reference to FIGS. 2 and 4, the cable 306 being connected to one of the ports. A further port is connected to an access point outdoor unit 308 which comprises the switching arrangement 31, a media access control layer 32, a modem 33, a radio 34 and an antenna 35. The switching arrangement 31 allows multiple units to be connected in a ring, creating a distributed ATM switch and includes a processor 44 which is able to configure the switching arrangement 31 in accordance with the control data packets sent by the interface unit 300. This operates in accordance with the operation of the controller and controlled units as described with reference to FIGS. 1 and 2. The outdoor unit 308 is connected to the concentrator 307 by means of a cable 309, which may be an optical fibre and the transmission protocol may be ATM 155 (OC3c/STM-1). Further ports from the concentrator 307 are available via cables 310, 311, 312 and 313 and may be connected to other access point outdoor units. The subscriber unit comprises a controller 320 which includes a digital signal processor 321, microprocessor 322, ATM physical layer 323 and physical layer 324 which converts data fed at input 325, 326 and 327 into ATM cells for transmission from the ATM layer 323 to the subscriber unit outdoor unit 329. The outdoor unit 329 includes a switching arrangement 31, a media access control layer 36, modem 37, radio 38 and antenna 39. The outdoor unit accepts data packets from the controller 320 and transmits them to the access point 308 and receives data from the access point 308 and relays it to the ATM physical layer 323 for onward transmission to the ports 325, 326 and 327.

Figure 9:
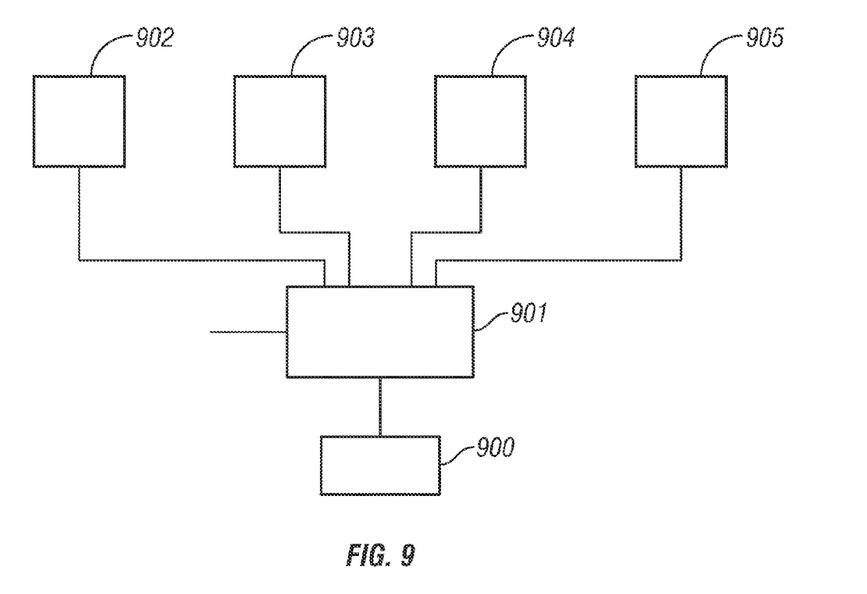
FIG. 9 shows a network of the form shown in FIG. 2 for use in a fixed wireless access system base station.

FIG. 9 shows a network comprising a controller 900 which may take the form of the AP indoor control unit 300 and a concentrator 901 which may take the form of the concentrator 307 in FIG. 3. The concentrator has four ports which connect to AP outdoor units 902, 903, 904 and 905. The application of such a system is where the outdoor units may be mounted at the top of a single pole in a pseudo star network. The outdoor units typically have a antenna spread of 90° and hence four are required to cover a 360° area. Thus each sector can support a number of subscriber units, typically up to 1,024.

Figure 10:
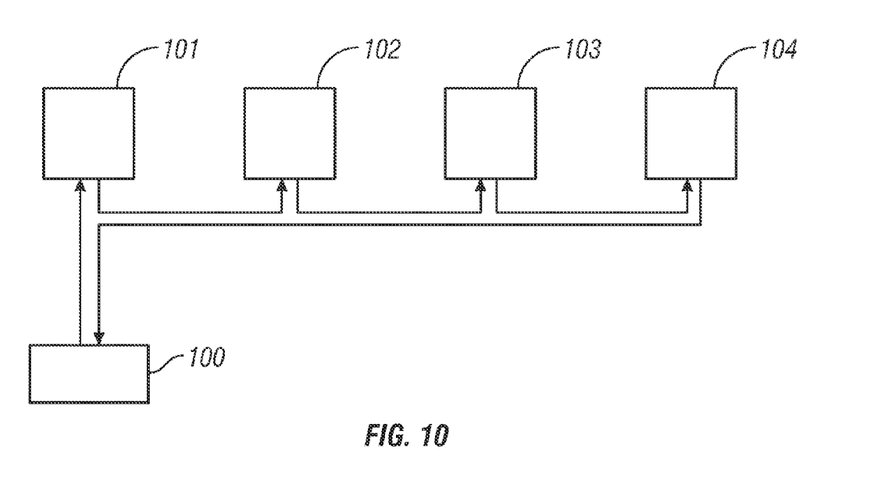
FIG. 10 shows a network of the form shown in FIG. 1 for use in a fixed wireless access system base station.

FIG. 10 shows an alternative arrangement which is equivalent to that shown in FIG. 1 and may be used where a single access point controller 100 is feeding a number of access point outdoor units 101, 102, 103 and 104 via fibre optic links. The access point outdoor units may be widely separated, for example on telephone poles in a ring network. By providing control and data using ATM packets it is possible to locate the outdoor unit at a considerable distance for example up to 1.5 kms from the controller 100. The outdoor unit merely needs a local power supply to operate and is controlled over the fibre optic links.

It will be clear that in the arrangement shown in FIG. 9 two cables are required for each controlled unit to terminate in the concentrator 901, that is for outward and inward transmission. In the arrangement shown in FIG. 10, however, only a single cable is required to link the controlled units as the return path to the controller is from the last controlled unit in the chain. Thus for widely spaced units a large distance from the controller, or concentrator, the arrangement of FIG. 10 has a lower cable cost.

While the invention has been described in terms of a fixed wireless access communications network it is not restricted to such a use and neither is the use of ATM essential to the invention. It merely requires that the same transport that is used to transmit the data is also used to transmit control signals which are able to trigger switching arrangements at the input to the controlled units to enable the controlled units to identify that data and control information which is to be used by that controlled unit.

The invention claimed is:

1. A packet switched communications network comprising:
   a controller and a plurality of controlled units arranged in a ring, wherein each of the controlled units comprises a switch at its input, the switch including control means responsive to control instructions contained in packets transmitted by the controller, the control means being arranged to configure the switch so that the switch passes control instructions and data into or out of the unit in a first configuration and the switch bypasses the unit and passes the control instructions and data to a further unit connected to the controller or back to the controller in a second configuration, wherein the controller is arranged to transmit periodically broadcast packets which any unit not previously registered with the controller is able to detect, each broadcast packet including a unique registration address to be adopted by an unregistered unit for registration with and for subsequent control by and communication with the controller.

2. A network as claimed in claim 1 in which each controlled unit includes a watchdog timer which is set by receipt of the broadcast packet.

3. A network as claimed in claim 2 in which the controller transmits at regular intervals a control instruction to cause the watchdog timer to reset.

4. A network as claimed in claim 3 in which if the watchdog timer times out, the unit is arranged to reset so that it reacts to a subsequent broadcast packet to adopt a new registration address.

5. A network as claimed in claim 4 in which each of the controlled units comprises a number of registers to or from which the controller may write or read instructions or data.

6. A network as claimed in claim 3 in which each of the controlled units comprises a number of registers to or from which the controller may write or read instructions or data.

7. A network as claimed in claim 2 in which if the watchdog timer times out, the unit is arranged to reset so that it reacts to a subsequent broadcast packet to adopt a new registration address.

8. A network as claimed in claim 7 in which each of the controlled units comprises a number of registers to or from which the controller may write or read instructions or data.

9. A network as claimed in claim 2 in which each of the controlled units comprises a number of registers to or from which the controller may write or read instructions or data.

10. A network as claimed in claim 1 in which each of the controlled units comprises a number of registers to or from which the controller may write or read instructions or data.

11. A network as claimed in claim 10 in which registers which may be read by the controller contain information entered during manufacture identifying the controlled unit and its properties.

12. A network as claimed in claim 1 in which each controlled unit includes a watchdog timer which is set by receipt of the broadcast packet.

13. A network as claimed in claim 12 in which if the watchdog timer times out, the unit is arranged to reset so that it reacts to a subsequent broadcast packet to adopt a new registration address.

14. A network as claimed in claim 12 in which each of the controlled units comprises a number of registers to or from which the controller may write or read instructions or data.

15. A network as claimed in claim 1 in which each of the controlled units comprises a number of registers to or from which the controller may write or read instructions or data.

16. A packet switched communications network comprising:

a controller and a plurality of controlled units arranged in a ring, wherein each of the controlled units comprises a switch at its input, the switch including control means responsive to control instruction contained in packets transmitted by the controller, the control means being arranged to configured the switch so that the switch passes control instructions and data into or out of the unit in a first configuration and the switch bypasses the unit and passes the controller or back to the controller in a second configuration, wherein the controller is arranged to transmit periodically broadcast packets which any unit not previously registered with the controller is able to detect, each broadcast packet including a unique registration address to be adopted by an unregistered unit for registration with and for subsequent control by and communication with the controller, wherein an unregistered unit, on detection of the broadcast packet, adopts the unique address and modifies the broadcast packet before passing it on to further units to prevent any subsequent unit from adopting the unique address.

17. A network as claimed in claim 16 in which each controlled unit includes a watchdog timer which is set by receipt of the broadcast packet.

18. A network as claimed in claim 17 in which if the watchdog timer times out, the unit is arranged to reset so that it reacts to a subsequent broadcast packet to adopt a new registration address.

19. A network as claimed in claim 17 in which each of the controlled units comprises a number of registers to or from which the controller may write or read instructions or data.

20. A network as claimed in claim 16 in which each of the controlled units comprises a number of registers to or from which the controller may write or read instructions or data.

* * * * *